(12) United States Patent
Kuroda et al.

(10) Patent No.: US 7,765,902 B2
(45) Date of Patent: Aug. 3, 2010

(54) CUTTING TOOL FOR HIGH-QUALITY HIGH-EFFICIENCY MACHINING AND CUTTING METHOD USING THE SAME

(75) Inventors: Yoshihiro Kuroda, Hyogo (JP); Satoru Kukino, Hyogo (JP); Katsumi Okamura, Hyogo (JP); Tomohiro Fukaya, Hyogo (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 869 days.

(21) Appl. No.: 11/631,636

(22) PCT Filed: Mar. 29, 2006

(86) PCT No.: PCT/JP2006/030643

§ 371 (c)(1),
(2), (4) Date: Jan. 5, 2007

(87) PCT Pub. No.: WO2007/039944

PCT Pub. Date: Apr. 12, 2007

(65) Prior Publication Data

US 2008/0292415 A1    Nov. 27, 2008

(30) Foreign Application Priority Data

Oct. 6, 2005    (JP)    ............................. 2005-293991

(51) Int. Cl.
*B23B 3/00*    (2006.01)
*B23C 5/16*    (2006.01)

(52) U.S. Cl. .................. 82/1.11; 407/113; 407/119

(58) Field of Classification Search ......... 407/113–116, 407/119; 82/1.11
See application file for complete search history.

(56) References Cited

U.S. PATENT DOCUMENTS

| 4,990,036 | A  | * | 2/1991 | Eklund et al. | ............... | 407/113 |
| 6,217,263 | B1 | * | 4/2001 | Wiman et al. | ............... | 407/114 |
| 6,612,786 | B1 |   | 9/2003 | Kanada et al. | | |
| 2002/0127068 | A1 |   | 9/2002 | Kinukawa et al. | | |
| 2007/0248424 | A1 | * | 10/2007 | Omori et al. | ................ | 407/113 |
| 2008/0159820 | A1 | * | 7/2008 | Baernthaler et al. | ......... | 407/113 |
| 2008/0260476 | A1 | * | 10/2008 | Ishida | ........................ | 407/114 |

(Continued)

FOREIGN PATENT DOCUMENTS

JP    59-42201 A    3/1984

(Continued)

*Primary Examiner*—Will Fridie, Jr.
(74) *Attorney, Agent, or Firm*—McDermott Will & Emery LLP

(57) ABSTRACT

It is an object to provide a cutting tool which can perform high-quality, high-efficiency machining of a workpiece such as hardened steel.

The cutting tool includes a finishing cutting edge 6 which initially cuts into the workpiece, and superfinishing cutting edges 7 for finishing the workpiece cut by the finishing cutting edge. The superfinishing cutting edges 7 project from the finishing cutting edge by a predetermined amount B in such a direction that the depth of cut of the superfinishing cutting edges increases. Each superfinishing cutting edge includes a burnishing portion 7a having a predetermined width L in the feed direction of the tool, and a wiper portion 7b. The superfinishing cutting edges 7 burnish the finished surface formed by the finishing cutting edge, while removing a affected layer formed by the finishing cutting edge.

17 Claims, 6 Drawing Sheets

U.S. PATENT DOCUMENTS

| | | |
|---|---|---|
| 2008/0260477 A1* | 10/2008 | Omori et al. ............... 407/119 |
| 2008/0279644 A1* | 11/2008 | Endres ....................... 408/56 |
| 2008/0292415 A1* | 11/2008 | Kuroda et al. .............. 407/61 |
| 2009/0004449 A1* | 1/2009 | Ban et al. ................... 428/216 |
| 2009/0232611 A1* | 9/2009 | Omori et al. ............... 407/114 |

FOREIGN PATENT DOCUMENTS

| | | |
|---|---|---|
| JP | 63-110304 | 7/1988 |
| JP | 1-199702 A | 8/1989 |
| JP | 2-164774 | 6/1990 |
| JP | 2001-212703 | 8/2001 |
| JP | 2002-192407 A | 7/2002 |
| WO | WO 95/00272 | 1/1995 |

* cited by examiner

Fig. 5
Fig. 6
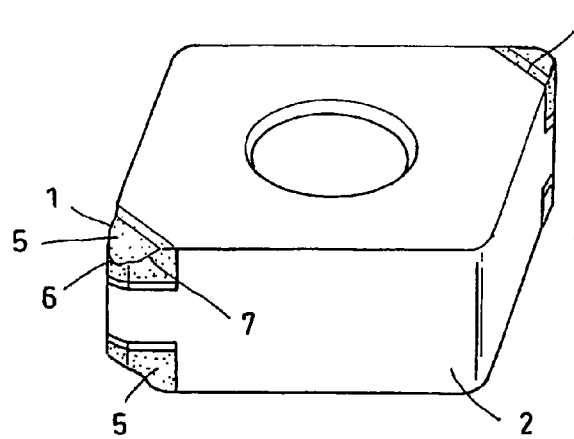
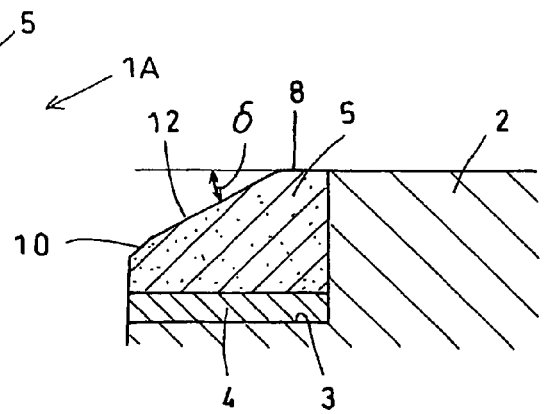
Fig. 7
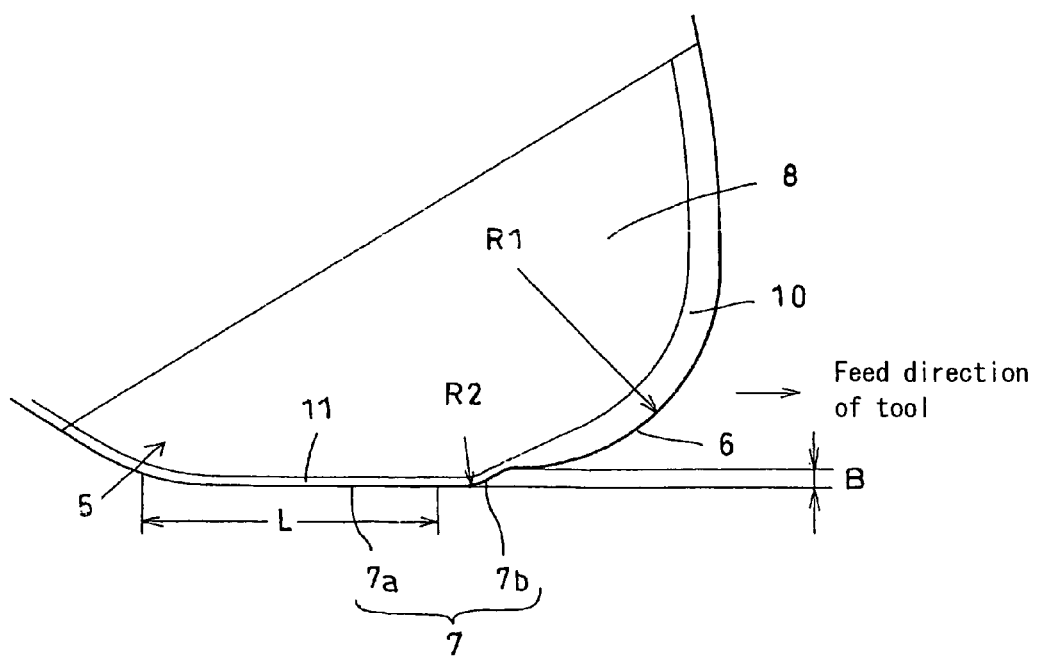

Feed rate/rev

Feed rate/rev ated Applications

This application is the U.S. National Phase under 35 U.S.C. §371 of International Application No. PCT/JP2006/306438 filed on Mar. 29, 2006, which in turn claims the benefit of Japanese Application No. 2005-293991, filed on Oct. 6, 2005, the disclosures of which Applications are incorporated by reference herein.

TECHNICAL FIELD

This invention relates to a cutting tool capable of performing high-quality, high-efficiency cutting of (metal) workpieces, and specifically a cutting tool which can particularly advantageously cut hardened steel, and a method of cutting workpieces using such a cutting tool.

BACKGROUND ART

Cutting tools capable of performing high-quality, high-efficiency cutting of workpieces are disclosed in the below-mentioned Patent documents 1 and 2.

The cutting tool disclosed in Patent document 1 is used for machining hardened steel and includes a major cutting edge which performs a major portion of the necessary cutting, and a minor cutting edge connecting with the major cutting edge to remove a affected layer formed on the surface of the workpiece by the major cutting edge and simultaneously finish the surface to required dimensions.

The cutting tool (indexable insert) disclosed in Patent document 2 includes a cutting edge for rough cutting and a cutting edge for finish cutting. The cutting edge for finish cutting removes any feed mark formed on the surface of the workpiece when the cutting edge for rough cutting is fed to cut the workpiece. Commercially available wiper inserts having wiper cutting edges also include a cutting edge for rough cutting and a cutting edge for finish cutting.

In the cutting tool disclosed in Patent document 1, the minor cutting edge, which defines an arcuate nose, removes a affected layer (also called "white etching layer") formed on the finished surface by the major cutting edge. But in this arrangement, the shape of the minor cutting edge tends to be transferred onto the finished surface in the form of corrugated feed marks, thus detrimentally influencing the surface roughness of the finished surface. Although the surface roughness of the finished surface can be improved by reducing the depth of cut of the minor cutting edge and the feed rate of the tool, this solution will reduce the machining efficiency.

In order to improve the fatigue strength, it is desired that no affected layer be present on the finished surface of the workpiece, and that compressive stress remain on the finished surface. In this regard, the tool of Patent document 1 can scarcely apply compressive stress on the finished surface, though its minor cutting edge can remove any affected layer. Thus, if it is necessary to apply compressive stress to the surface (finished surface) of the workpiece, it is necessary to burnish the finished surface later using a burnishing tool.

The finishing cutting edge of the cutting tool disclosed in Patent document 2 and the wiper cutting edge of a commercially available wiper insert are both basically used for cutting workpieces. These cutting edges cut portions that are left uncut by the cutting edge for rough cutting, i.e. the crests of the feed marks. Thus, the finishing cutting edge and the wiper cutting edge are not cut into the workpiece, exceeding the depth of cut d of the cutting edge for rough cutting, and therefore cannot remove any affected layer. They scarcely have the burnishing function, either. Thus, if residual compressive stress is required on the surface of the workpiece, it is necessary to burnish the surface of the workpiece, as with the tool of Patent document 1.

Patent document 1: Japanese patent publication 59-42201A

Patent document 2: Japanese utility model publication 63-110304

DISCLOSURE OF THE INVENTION

Object of the Invention

An object of the present invention is to achieve high-quality, high-efficiency machining of a workpiece such as hardened steel. As used herein, the term "high-quality machining" means to machine a workpiece such that a affected layer is formed on its finished surface in a reduced amount, its surface roughness is improved and compressive residual stress is applied thereto.

Means to Achieve the Object

In order to achieve the object, the cutting tool according to the invention has hard members involved in cutting and having a finishing cutting edge which is first cut into a workpiece, and superfinishing cutting edges for burnishing the finished surface of the workpiece while removing a affected layer formed by the finishing cutting edge.

In order that the cutting tool according to the invention can remove a affected layer and burnish the finished surface, the superfinishing cutting edges project from the finishing cutting edge in such a direction that the depth of cut increases, and the superfinishing cutting edges each comprise a burnishing portion having a predetermined width in the feed direction of the tool (which is preferably not less than three times the feed rate during cutting), and a wiper portion extending from the finishing cutting edge to the burnishing portion.

Preferred forms of the cutting tools according to the invention are listed below.

(1) The burnishing portions are straight portions or arcuate portions having a radius of curvature of not less than 2 mm, the width L of the burnishing portions is set within the range of $0.2\text{ mm} \leq L \leq 1.0\text{ mm}$, and the amount of projection B of the superfinishing cutting edges from the finishing cutting edge is set within a range of $0.01\text{ mm} \leq B \leq 0.1\text{ mm}$, more preferably within a range of $0.02\text{ mm} \leq B \leq 0.07\text{ mm}$.

(2) The finishing cutting edge and the superfinishing cutting edges have chamfers for strengthening the respective cutting edges, the chamfers of the superfinishing cutting edges having a width W2 that is smaller than the width W1 of the chamfer of the finishing cutting edge. More preferably, the width W2 of the chamfers of the superfinishing cutting edges is set within a range of $0.005\text{ mm} \leq W2 \leq 0.04\text{ mM}$.

(3) The finishing cutting edge is formed at a corner, and the superfinishing cutting edges are formed on right and left sides of the finishing cutting edge.

(4) The finishing cutting edge has steps in the direction in which the tool is cut into a workpiece, whereby the steps individually cut different portions of the workpiece.

(5) The burnishing portion of each of the superfinishing cutting edges has steps in the direction in which the tool is cut into a workpiece, whereby a finished surface of the workpiece is cut first by one of the steps of which the amount of projection B is the smallest, and then by another of the steps of which the amount of projection B is the second smallest.

(6) The abovementioned hard members each comprise a cBN-based sintered body (5) containing not less than 65% and not more than 85% by volume of cBN particles and having a thermal conductivity of not more than 70 W/m·K, and a hard film made of a carbide, nitride, oxide, carbonitride or carboxynitride of at least one element selected from the group consisting of the elements of the 4a, 5a and 6a groups in the periodic table and Al and covering the surface of the cBN-based sintered body.

The tool that meets the requirements (1) above or the tool that further meets the requirements of at least one of items (2) to (6) above is preferably used such that the depth of cut d1 of the finishing cutting edge is greater than the depth of cut d2 of the superfinishing cutting edges, and the feed rate f (mm/rev) satisfies the relations $2 \leq L$ (width of the burnishing portions of the superfinishing cutting edges: mm)/f$\leq 8$ and $0.08 \leq f \leq 0.3$.

ADVANTAGES OF THE INVENTION

The cutting tool according to the present invention has superfinishing cutting edges which have both the cutting function and burnishing function. The superfinishing cutting edges remove a affected layer formed by the finishing cutting edge, and simultaneously burnish the surface of the workpiece, thereby applying compressive residual stress to the finished surface.

Further, like the major cutting edge of the tool disclosed in Patent document 1, the superfinishing cutting edges are cut into the workpiece until their depth of cut exceeds that of the finishing cutting edge to remove a affected layer. The superfinishing cutting edges have burnishing portions extending in the feed direction of the tool and having a large width. Thus, feed marks formed on the finished surface by the superfinishing cutting edges are small compared to the tool of Patent document 1. This makes it possible to improve the machining efficiency by increasing the depth of cut of the superfinishing cutting edges and the feed rate of the tool, or to suppress the formation of a affected layer by reducing the load on (i.e. depth of cut of) the finishing cutting edge.

Due to these advantages, well-balanced, efficient machining of a workpiece is possible. The machined surface has improved surface roughness with a affected layer sufficiently removed and compressive residual stress applied thereto. The machined surface can thus be finished to a high quality.

The present invention is applicable to a cutting tool for machining aluminum and aluminum alloy (in which case the hard members involved in cutting are preferably made of sintered diamond). But advantages of the invention will be especially marked if the concept of the present invention is applied to a cutting tool for machining hardened steel.

In the tool used to cut hardened steel, if the amount of projection B of the superfinishing cutting edges from the finishing cutting edge is less than 0.01 mm, the depth of cut by the superfinishing cutting edges will be not more than 0.005 mm under the influence of the elastic deformation of the workpiece. In such a case, although compressive residual stress can be applied during burnishing, if the thickness of affected layer formed by the finishing cutting edge exceeds 0.005 mm, the superfinishing cutting edges cannot sufficiently remove such a affected layer.

On the other hand, if the amount of projection B of the superfinishing cutting edges is greater than 0.1 mm, heat generation during cutting with the superfinishing cutting edges will increase to an unignorable level. This increases the possibility of a affected layer being formed by the superfinishing cutting edges. Such a affected layer tends to reduce the effect of burnishing, thus making it difficult to apply sufficient compressive residual stress. Also, due to increased depth of cut, the superfinishing cutting edges tend to deeply cut into the workpiece. Thus, the superfinishing cutting edges can hardly perform burnishing. This further reduces compressive stress applied. This in turn makes it difficult to increase the fatigue strength of the machined surface. If attempts are made to increase the burnishing effect by increasing the pressing force, heat generation tends to increase, thus reducing the residual stress, and in the worst case, the tensile stress may be applied. In order to avoid this problem, the amount of projection B of the superfinishing cutting edges is preferably set within a range of $0.01 \text{ mm} \leq B \leq 0.1 \text{ mm}$, more preferably $0.02 \text{ mm} \leq B \leq 0.07 \text{ mm}$. Within this range, it is possible to remove any affected layer formed by the finishing cutting edge, which is high in machining efficiency, with the superfinishing cutting edges while preventing excessive heat generation. Burnishing can also be reliably performed.

The width L of the burnishing portions of the superfinishing cutting edges is preferably not less than three times the typical tool feed rate per revolution (0.05 to 0.2 mm) because with this arrangement, it is possible to apply higher compressive force to the finished surface by pressing and flattening feed marks formed on the finished surface when the shape of the finishing cutting edge is transferred onto the finished surface. Thus, the width L is preferably about $0.2 \text{ mm} \leq L \leq 1.0 \text{ mm}$. By restricting the width L of the burnishing portions to not more than 1.0 mm, it is possible to prevent excessive increase in the number of times the feed marks are pressed and flattened by the burnishing portions. This suppresses heat generation at the surface of the workpiece cut by the superfinishing cutting edges, thereby preventing the formation of a affected layer, which would reduce the burnishing effect, thereby making it difficult to apply compressive residual stress.

The burnishing portions, which are curved so as to be convex outwardly of the tool, each include an arcuate cutting edge having a radius of curvature of not less than 2 mm. With this arrangement, it is possible to press and flatten feed marks formed by the finishing cutting edge at least twice.

By forming chamfers on the finishing cutting edge and the superfinishing cutting edges, it is possible to reduce the possibility of chipping of the cutting edges. Since cutting loads applied to the superfinishing cutting edges are lower than those applied to the finishing cutting edge, the chamfer width W2 of the superfinishing cutting edges may be smaller than the chamfer width W1 of the finishing cutting edge. By setting the chamfer width W2 at not less than 0.005 mm, it is possible to prevent the superfinishing cutting edges from being too sharp. If the superfinishing cutting edges are too sharp, while it is possible to remove a affected layer, no sufficient compressive residual stress can be applied by burnishing. By setting the chamfer width W2 of the superfinishing cutting edges at not more than 0.04 mm, it is possible to suppress heat generation at the portion of the workpiece where it is machined by the superfinishing cutting edges, thereby preventing a affected layer from being formed by the superfinishing cutting edges.

By providing the finishing cutting edge at the corner and providing two superfinishing cutting edges on the right and left sides of the finishing cutting edge, it is possible to selectively use one of the superfinishing cutting edges.

The finishing cutting edge may have steps in the direction in which the tool is cut into a workpiece, whereby the steps individually cut different portions of the workpiece. The burnishing portion of each of the superfinishing cutting edges may have steps in the direction in which the tool is cut into a workpiece, whereby a finished surface of the workpiece is cut first by one of the steps of which the amount of projection B is the smallest, and then by another of the steps of which the amount of projection B is the second smallest. With these arrangements, it is possible to reduce loads on the cutting edges when the depth of cut of the finishing cutting edge or superfinishing cutting edges is large. This makes it possible to suppress the formation of a affected layer and maintain high burnishing effect.

If the tool is used to cut hardened steel, the hard members forming the portions involved in cutting are preferably made of the material described in item (6) above, because this material is durable.

Preferably, the workpiece is cut with the depth of cut d1 of the finishing cutting edge set to be greater than the depth of cut d2 of the superfinishing cutting edges, and the feed rate f (mm/rev) set so as to satisfy the relations $2 \leq L$ (width of the burnishing portions of the superfinishing cutting edges: mm)/$f \leq 8$ and $0.08 \leq f \leq 0.3$. By satisfying these requirements, feed marks Rf formed by the finishing cutting edges (see FIG. 13) will be $2.4 \ \mu m \leq Rf \leq 4.8 \ \mu m$, and feed marks Rsf formed by the superfinishing cutting edges (see FIG. 14) will be $0.01 \ \mu m \leq Rsf \leq 0.8 \ \mu m$. Thus, by burnishing with the superfinishing cutting edges, the theoretical surface roughness will improve to 0.8 μm or less. Also, a high-quality finished surface is obtained with a affected layer removed and high compressive residual stress applied thereto.

BRIEF DESCRIPTION OF THE DRAWINGS

FIG. 5 is a perspective view of another cutting tool according to the present invention;

FIG. 6 is an enlarged view of the cutting tool of FIG. 5, showing a portion of a side thereof;

FIG. 7 is an enlarged plane view of another cutting tool according to the present invention, showing its cutting edge;

DESCRIPTION OF REFERENCE NUMERALS

Figure 1A:
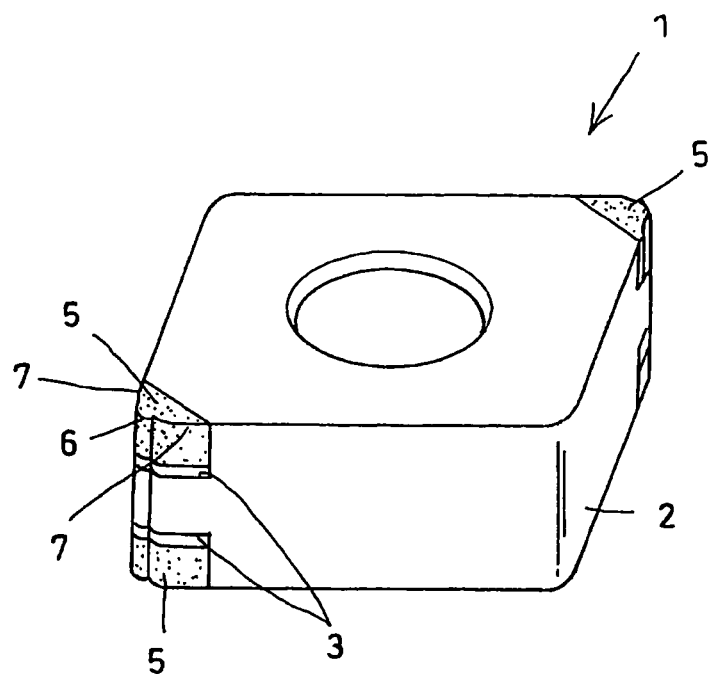
FIG. 1(a) is a perspective view of a cutting tool according to the present invention.

1, 1A: Indexable inserts
2: Substrate made of cemented carbide
3: Seat
4: Carbide backing
5: cBN-based sintered body
6: Finishing cutting edge
7: Superfinishing cutting edge
7a: Burnishing portion
7b: Wiper portion
8: Rake face
9: Flank
10, 11: Chamfer

BEST MODE FOR EMBODYING THE INVENTION

Figure 1B:
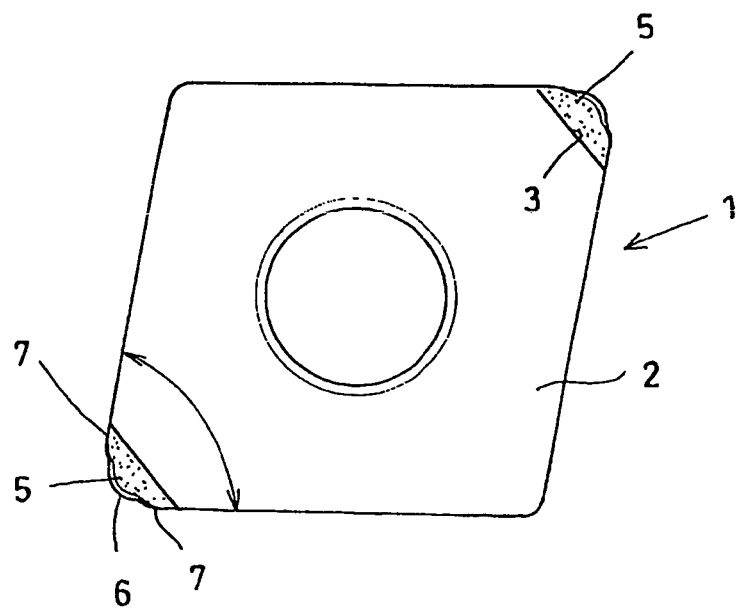
FIG. 1(b) is a plane view of the tool of FIG. 1(a)

Cutting inserts embodying the present invention are now described with reference to FIGS. 1 to 7. FIG. 1 shows a diamond-shaped, negative indexable insert according to the present invention. This insert 1 comprises a substrate 2 made of cemented carbide and formed with a seat 3 in each acute-angled arcuate corner (nose) having a corner angle α of 80°, and cBN-based sintered members 5 each having a carbide backing 4 and brazed to one of the seats 3.

The cBN-based sintered members 5 comprises a cBN-based sintered body containing not less than 65% and not more than 85% of cBN powder in volume percent and having a heat conductivity of not more than 70 W/m·K, and a film of a compound of at least one element selected from the group consisting of the elements of the 4a, 5a and 6a groups in the periodic table and Al, and at least one element selected from C, N and O, such as an oxide, carbide, nitride, carbonitride or carboxynitride of e.g. Ti.

Figure 2:
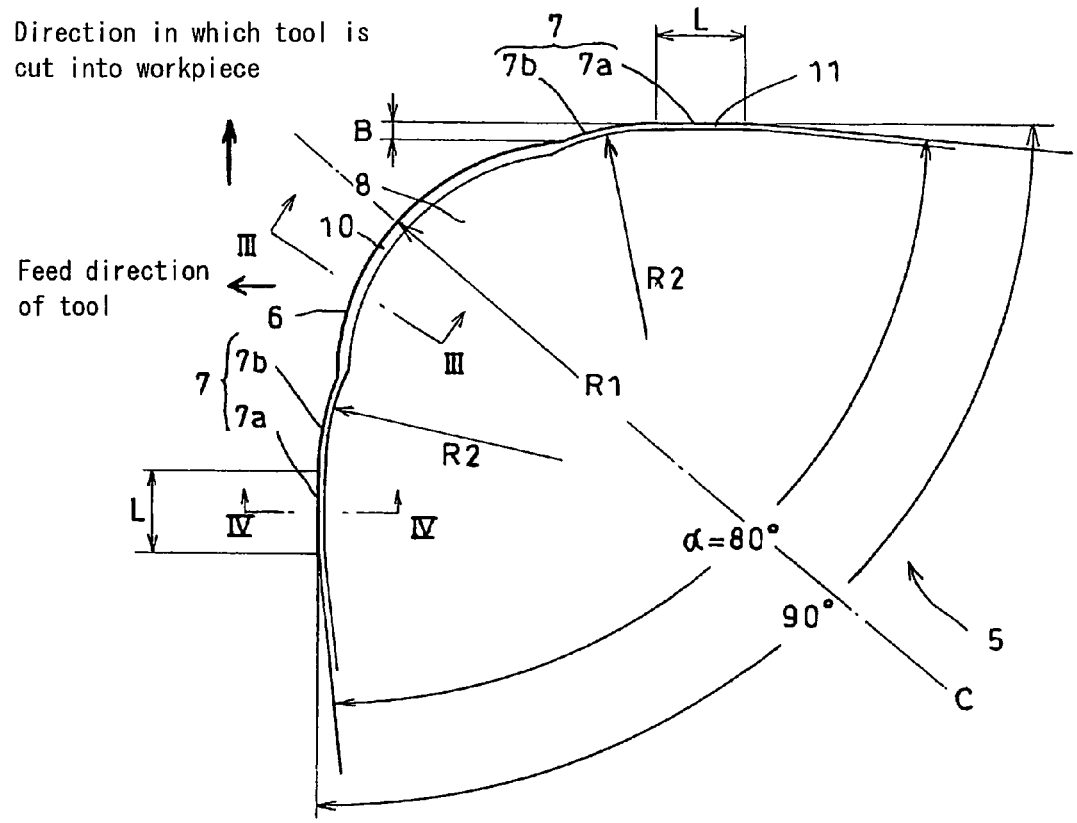
FIG. 2 is an enlarged plane view of a cutting edge of the cutting tool of FIG. 1(a)

FIG. 2 is an enlarged top plane view of one of the indexable inserts 1. Its cBN-based sintered body 5 has a cutting edge which is a ridge line defined between a rake face 8 and a flank 9. The cutting edge comprises a finishing cutting edge 6 and superfinishing cutting edges 7 each connecting with one end of the finishing cutting edge 6.

The finishing cutting edge 6 is formed at each corner of the cutting tool, defining an arcuate nose R having a radius of curvature of R1. Each superfinishing cutting edge projects by an amount of B in the direction in which the tool is cut into workpieces. For the abovementioned reason, the amount of projection B preferably satisfies the relation $0.01 \ mm \leq B \leq 0.1 \ mm$, more preferably the relation $0.02 \ mm \leq B \leq 0.07 \ mm$.

The superfinishing cutting edges 7 each comprise a burnishing portion 7a extending in the feed direction of the tool, and a wiper portion 7b extending from the end of the finishing cutting edge 6 to the burnishing portion 7a. The burnishing portion 7a of each superfinishing cutting edge 7 preferably extends in a straight line or extends arcuately with a radius of curvature R2 of not less than 2 mm. Preferably, the burnishing portion 7a has a width L of $0.2 \ mm \leq L \leq 1.0 \ mm$, for the abovementioned reason. The wiper portion 7b is not limited to an arcuate one as shown. It may be a straight cutting edge through which the finishing cutting edge 6 and the burnishing portion 7a are connected together. A recess may be formed between the finishing cutting edge 6 and the wiper portion 7b.

Figures 3, 4:
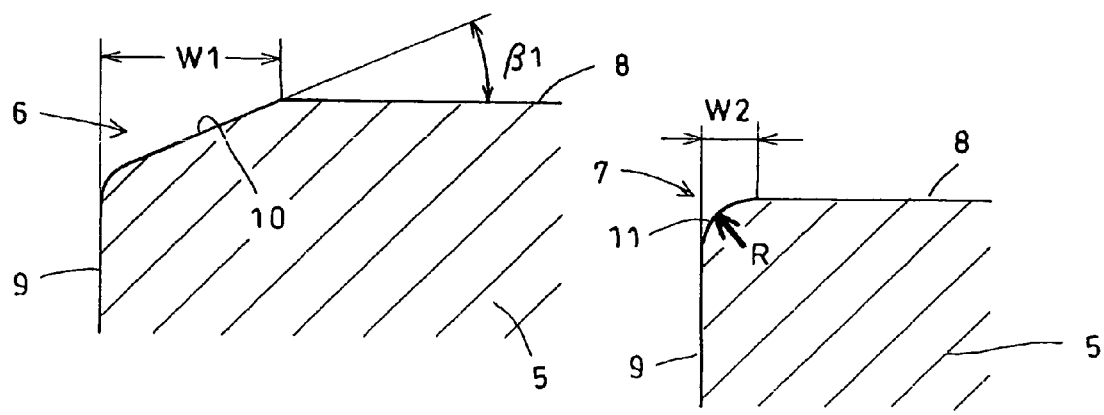
FIG. 3 is an enlarged sectional view taken along line III-III of FIG. 2.
FIG. 4 is an enlarged sectional view taken along line IV-IV of FIG. 2.

The finishing cutting edge 6 and the superfinishing cutting edges 7 may have their edges subjected to strengthening treatment by known chamfering (as shown in FIGS. 3 and 4). The chamfers 11 formed on the superfinishing cutting edges 7 have a width W2 that is smaller than the width W1 of the chamfer 10 formed on the finishing surface 6. For the above-mentioned reason, the width W2 of the chamfer 11 preferably satisfies the relation 0.005 mm$\leq$W2$\leq$0.04 mm. The chamfers may be flat ones (which should be connected to the rake face and flank through small arcuate portions), or those formed by round honing.

FIGS. 5 and 6 show another embodiment of the invention, which is also a cutting tool with indexable inserts. Each indexable insert 1A has a rake face 8 including a negative land 12 having an inclination angle $\delta$ of 20 to 35° to improve resistance to chipping of the cutting edge. Otherwise, the insert of this embodiment is substantially identical in structure to the insert of FIG. 1. Thus its further description is omitted.

FIG. 7 shows a further embodiment. The indexable inserts of FIGS. 1 and 5 include superfinishing cutting edges 7 on both sides of the finishing cutting edge 6 so as to be symmetrical to each other with respect to the bisector C (see FIG. 2) of the corner angle so that both sides of the cutting edge are usable. But as shown in FIG. 7, one of the superfinishing cutting edges 7 may be omitted.

Figure 8:
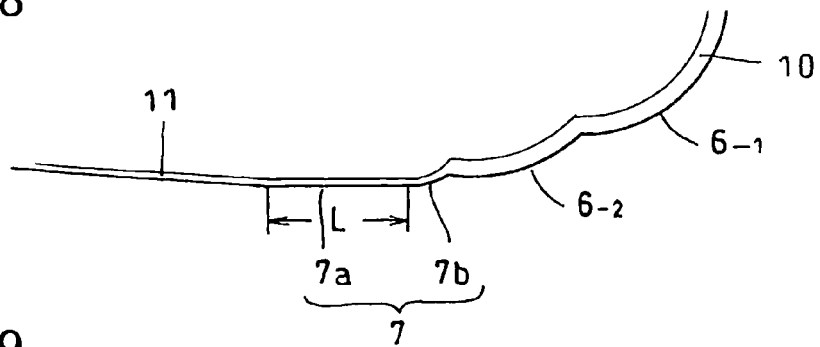
FIG. 8 is an enlarged plane view of still another cutting tool according to the present invention, showing its cutting edge.

As shown in FIG. 8, the finishing cutting edge 6 may comprise two or more stepped portions, so that the respective stepped portions (e.g. stepped portions $6_{-1}$ and $6_{-2}$ shown) individually perform cutting, thus protecting the cutting edge, and suppressing heat generation and the formation of a affected layer even if the entire finishing cutting edge 6 is cut deep into a workpiece.

Figure 9:
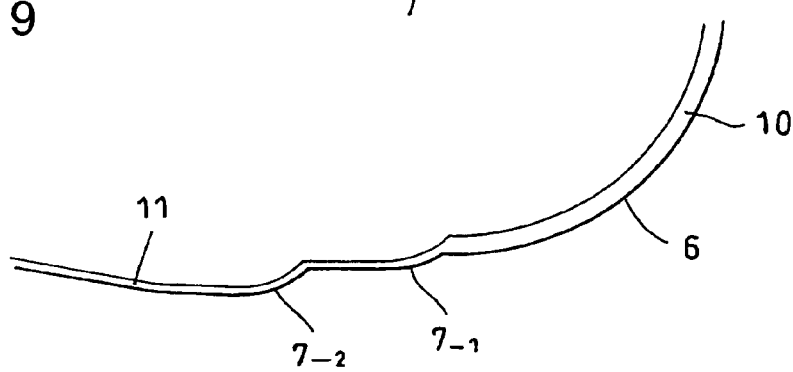
FIG. 9 is an enlarged plane view of yet another cutting tool according to the present invention, showing its cutting edge.

As shown in FIG. 9, the superfinishing cutting edges 7 may also each comprise two or more stepped portions. In this case too, the respective stepped portions (e.g. stepped portions $7_{-1}$ and $7_{-2}$ shown) individually perform cutting if the entire superfinishing cutting edge 7 is cut deep into a workpiece, thus protecting the cutting edge, and suppressing heat generation and the formation of a affected layer. The present invention is applicable to cutting tools other than indexable inserts.

Embodiments are now described.

Example 1

Cutting tool samples No. 1 to No. 42 shown in Tables 1A and 1B were prepared and evaluated for their cutting performance. Cutting tool samples No. 1 to No. 42 are formed of cBN-based sintered members of which the portions used for cutting have different shapes from each other. The cBN-based sintered members of each tool were formed by mixing cBN powder with binder powder comprising TiN and Al in a ball mill made of cemented carbide, and sintering the mixture in an ultrahigh pressure apparatus under a pressure of 5 GPa at 1500° C. Such cBN-based sintered members contained 60% by volume of cBN particles having an average particle diameter of 3 μm, the balance being Ti compounds primarily comprising TiN, Al compounds such as nitrides, borides or oxides of Al, and trace amounts of W and/or Co compounds.

Any of the cutting tools used in this evaluation test comprised a substrate made of cemented carbide, and cBN-based sintered members each having a thickness of 1.8 mm, a nose angle $\alpha$ of 80° and a bottom length of 4 mm, including a carbide backing made of cemented carbide and brazed to one of the corners of the substrate. The cBN-based sintered members are inserts each classified into CNMA120404, CNMA120408 or CNMA120412 under ISO and having a cutting edge comprising a conventional arcuate nose or wiper edge, or superfinishing cutting edges which characterize the present invention. The cBN-based sintered members were brazed to the substrate using a active brazing metal comprising 72 wt % of Ag, 25 wt % of Cu and 3 wt % of Ti.

For conventional tools (tool samples No. 1 to No. 12), after forming a rake face, side faces, arcuate nose and wiper cutting edges by grinding, chamfers having a predetermined angle were formed on the respective cutting edges. For the tools according to the invention (tool samples No. 13 to No. 42), after brazing each cBN-based sintered member with a carbide backing to the substrate, a rake face was formed at the cutting edge portion by grinding, and the finishing cutting edge and the superfinishing cutting edges were formed by wire electric discharge machining (WEDM). Thereafter, chamfers were formed on the finishing cutting edge and the superfinishing cutting edges.

With wiper cutting edges of conventional tools, the amount of projection from the arcuate nose in the direction in which the tool cuts into a workpiece is zero, so that such wiper cutting edges are never cut deeper into a workpiece than the cutting edge forming the arcuate nose is cut into the workpiece. Thus, such wiper cutting edges cannot remove any affected layer produced by the cutting edge forming the arcuate nose (affected layer disposed deeper than the troughs of feed marks). Such wiper cutting edges of conventional tools and the burnishing portion of each superfinishing cutting edge according to the present invention had their angle $\theta$ with respect to the tool feed direction determined so as to satisfy the relation 0° 20'$\leq\theta\leq$0° 40'.

Figure 11:
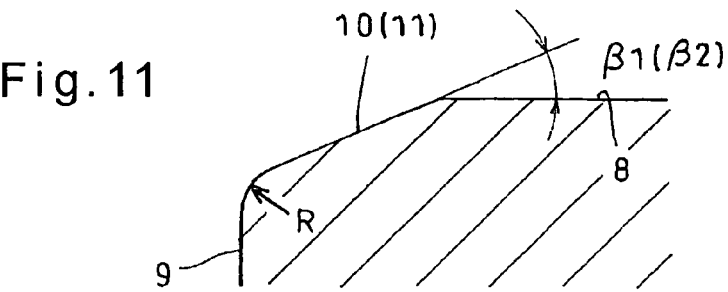
FIG. 11 is an enlarged sectional view of a tool, showing the radius of curvature of a portion where a flat chamfer is connected to a flank.

Other specifications are shown in Tables 1A and 1B. Except for samples 5 and 6, the border between the chamfer, which has a width W1, and the flank is rounded with a radius of curvature of 0.01 mm (see FIG. 11). The letter R in the column of "chamfer angle" in the tables indicates that the chamber is a round chamfer formed by honing. The number attached to the letter R, such as R10 or R100, indicates the radius of curvature of the corresponding chamfer.

Figure 12:
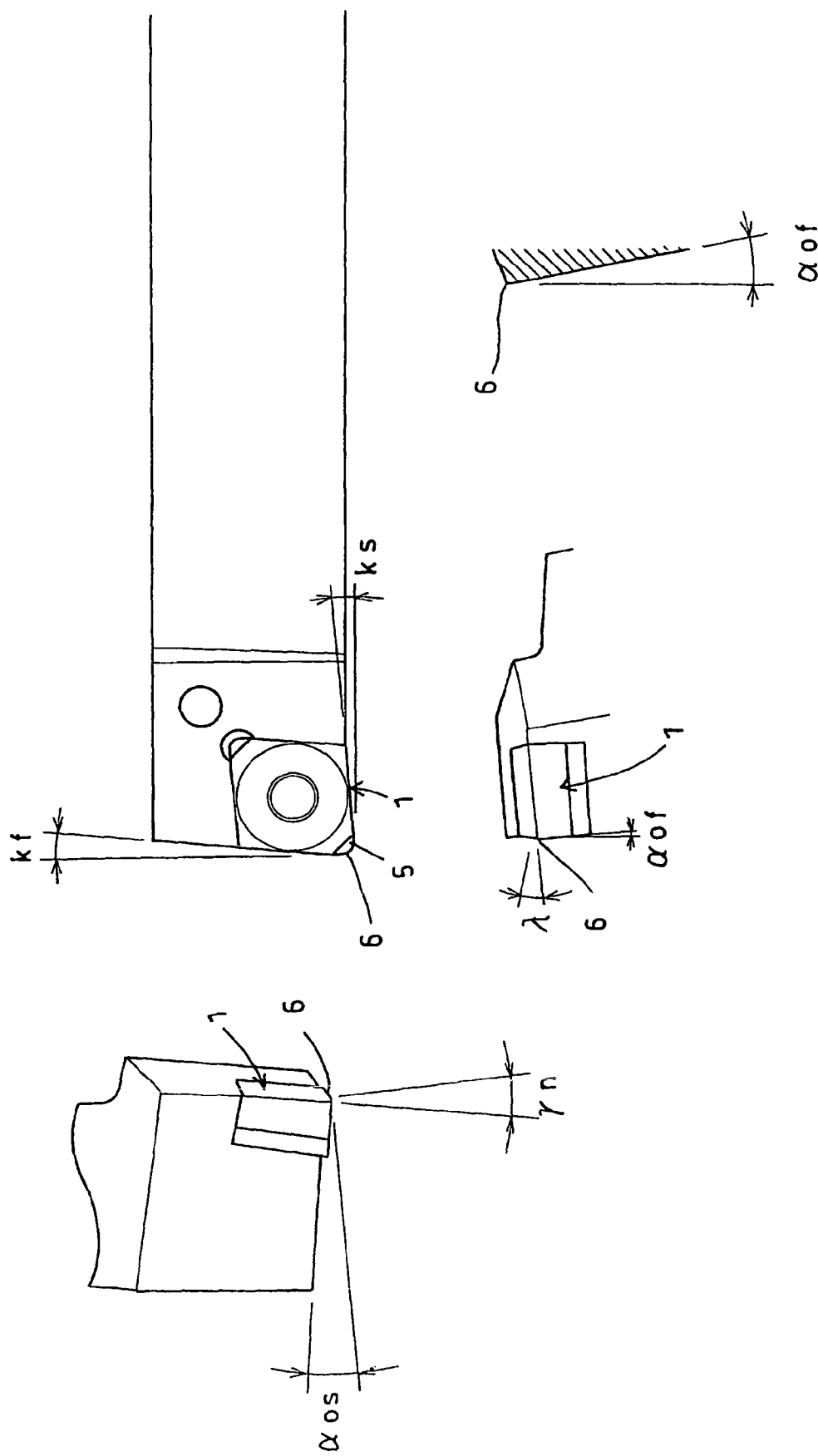
FIG. 12 shows the tool position in an embodiment.
Figure 13:
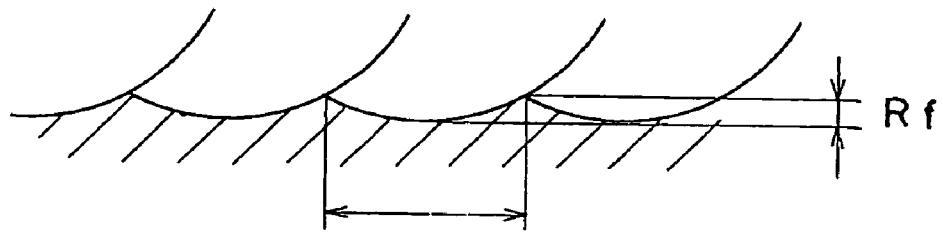
FIG. 13 shows feed marks Rf formed by a finishing cutting edge.
Figure 14:
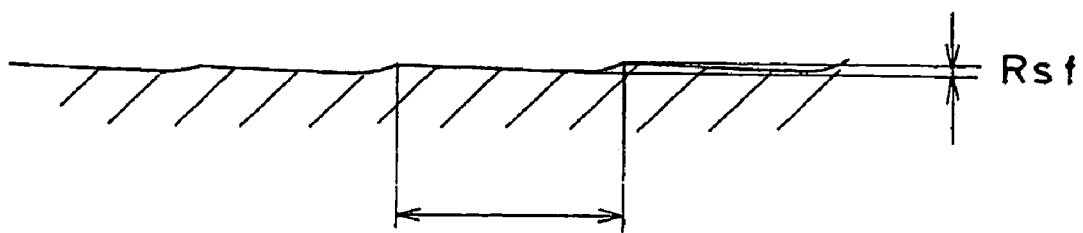
FIG. 14 shows feed marks Rsf formed by a superfinishing cutting edge.

Each cutting tool was mounted on a holder and used for cutting with the cutting edge inclination angle $\lambda$, side rake angle $\gamma n$, end clearance angle $\alpha of$, side clearance angle $\alpha os$, end cutting edge angle $\kappa f$ and side cutting edge angle $\kappa s$ (see FIG. 12) set at −5°, −5°, 5°, 5°, 5° and 5°, respectively, under the following cutting conditions.

—Cutting Conditions—

Workpiece: JIS type: SCR415H, outer diameter cutting (equivalent to DIN type: 15Cr3); Hardness: HRc 58-60

Cutting speed: V=150 m/min.

Depth of cut: d=0.2 mm

Feed rate: f=0.15 mm/rev.

Type of cutting: Continuous cutting of the outer periphery of a round rod with no coolant Cutting time: 60 minutes The results of the evaluation test are shown in Tables 1A and 1B. Evaluation was made for the thickness of the affected layer that remained on the finished surface after cutting, compressive residual stress of the finished surface, and the surface roughness of the finished surface.

TABLE 1A

| Sample No. | Finishing cutting edge | | | | | Superfinishing cutting edge | | | |
|---|---|---|---|---|---|---|---|---|---|
| | Nose R R1: mm | Chamfer angle β1: ° | Chamfer width W1: mm | Width of wiper cutting edge W: mm | Shape of wiper cutting edge | R of wiper portion R2 | Chamfer angle β2: ° | Chamfer width W2: mm | Width of burnishing portion L: mm |
| 1 | 0.4 | 25 | 0.13 | — | — | — | — | — | — |
| 2 | 0.8 | 25 | 0.13 | — | — | — | — | — | — |
| 3 | 1.2 | 25 | 0.13 | — | — | — | — | — | — |
| 4 | 1.6 | 25 | 0.13 | — | — | — | — | — | — |
| 5 | 0.8 | R | 0.02 | — | — | — | — | — | — |
| 6 | 1.6 | R | 0.02 | — | — | — | — | — | — |
| 7 | 0.8 | 25 | 0.13 | 0.5 | Straight line θ 32' | — | — | — | — |
| 8 | 0.8 | 25 | 0.13 | 1.0 | Straight line θ 29' | — | — | — | — |
| 9 | 0.8 | 25 | 0.13 | 0.5 | Arcuate R10 | — | — | — | — |
| 10 | 0.8 | 25 | 0.13 | 1.0 | Arcuate R10 | — | — | — | — |
| 11 | 0.8 | 25 | 0.13 | 0.5 | Arcuate R100 | — | — | — | — |
| 12 | 0.8 | 25 | 0.13 | 1.0 | Arcuate R100 | — | — | — | — |
| 13 | 0.8 | 25 | 0.13 | — | — | 0.8 | R | 0.02 | 0.5 |
| 14 | 0.8 | 25 | 0.13 | — | — | 0.8 | R | 0.02 | 0.5 |
| 15 | 0.8 | 25 | 0.13 | — | — | 0.8 | R | 0.02 | 0.5 |
| 16 | 0.8 | 25 | 0.13 | — | — | 0.8 | R | 0.02 | 0.5 |
| 17 | 0.8 | 25 | 0.13 | — | — | 0.8 | R | 0.02 | 0.5 |
| 18 | 0.8 | 25 | 0.13 | — | — | 0.8 | R | 0.02 | 0.5 |
| 19 | 0.8 | 25 | 0.13 | — | — | 0.4 | R | 0.02 | 0.5 |
| 20 | 0.8 | 25 | 0.13 | — | — | 1.2 | R | 0.02 | 0.5 |
| 21 | 0.8 | 25 | 0.13 | — | — | 0.8 | R | 0.02 | 1.0 |
| 22 | 0.8 | 25 | 0.13 | — | — | 0.8 | R | 0.02 | 1.2 |
| 23 | 0.8 | 25 | 0.13 | — | — | 0.8 | R | 0.02 | 0.5 |
| 24 | 0.8 | 25 | 0.13 | — | — | 0.8 | R | 0.02 | 1.0 |
| 25 | 0.8 | 25 | 0.13 | — | — | 0.8 | R | 0.02 | 0.5 |
| 26 | 0.8 | 25 | 0.13 | — | — | 0.8 | R | 0.02 | 1.0 |
| 27 | 0.8 | 25 | 0.13 | — | — | 0.8 | R | 0.003 | 0.5 |
| 28 | 0.8 | 25 | 0.13 | — | — | 0.8 | R | 0.005 | 0.5 |
| 29 | 0.8 | 25 | 0.13 | — | — | 0.8 | R | 0.04 | 0.5 |
| 30 | 0.8 | 25 | 0.13 | — | — | 0.8 | R | 0.05 | 0.5 |

| Sample No. | Superfinishing cutting edge Shape of burnishing portion | Amount of projection B: mm | Thickness of affected layer: μm | Residual stress: GPa | Surface roughness: Rz | Remarks 1 | Remarks 2 |
|---|---|---|---|---|---|---|---|
| 1 | — | — | 7.9 | −0.3 | 10.03 | | Nose with ordinary R |
| 2 | — | — | 8.4 | −0.3 | 8.74 | | Nose with ordinary R |
| 3 | — | — | 8.7 | −0.3 | 5.34 | | Nose with ordinary R |
| 4 | — | — | 9.1 | −0.3 | 3.24 | | Nose with ordinary R |
| 5 | — | — | — | — | — | Chipping occurred | Nose with ordinary R |
| 6 | — | — | — | — | — | Chipping occurred | Nose with ordinary R |
| 7 | — | — | 14.5 | −0.4 | 3.12 | | Straight wiper |
| 8 | — | — | 16.4 | −0.4 | 2.97 | | Straight wiper |
| 9 | — | — | 10.5 | −0.3 | 4.77 | | Arcuate wiper |
| 10 | — | — | 10.6 | −0.3 | 4.34 | | Arcuate wiper |
| 11 | — | — | 12.6 | −0.4 | 3.42 | | Arcuate wiper |
| 12 | — | — | 14.1 | −0.4 | 3.05 | | Arcuate wiper |
| 13 | Straight line θ 31' | 0.01 | 4.7 | −0.4 | 2.32 | | Small depth of cut |
| 14 | Straight line θ 32' | 0.02 | 1.0 | −0.4 | 2.41 | | Small depth of cut |
| 15 | Straight line θ 27' | 0.05 | 0.6 | −0.5 | 2.38 | | |
| 16 | Straight line θ 31' | 0.07 | 0.9 | −0.4 | 2.45 | | |
| 17 | Straight line θ 29' | 0.1 | 4.9 | −0.4 | 2.48 | | Large depth of cut |
| 18 | Straight line θ 31' | 0.12 | 7.6 | −0.3 | 2.37 | | Large depth of cut |
| 19 | Straight line θ 26' | 0.05 | 0.8 | −0.4 | 2.46 | | Small R 2 |
| 20 | Straight line θ 32' | 0.05 | 0.8 | −0.4 | 2.33 | | Large R 2 |

TABLE 1A-continued

| | | | | | | | |
|---|---|---|---|---|---|---|---|
| 21 | Straight line θ 35' | 0.05 | 4.6 | −0.6 | 2.28 | | Large L |
| 22 | Straight line θ 34' | 0.05 | 5.7 | −0.7 | 2.19 | | Large L |
| 23 | Arcuate R10 | 0.05 | 1.0 | −0.4 | 2.63 | | |
| 24 | Arcuate R10 | 0.05 | 2.5 | −0.6 | 2.47 | | Large L |
| 25 | Arcuate R100 | 0.05 | 0.9 | −0.4 | 2.51 | | |
| 26 | Arcuate R100 | 0.05 | 3.7 | −0.7 | 2.44 | | Large L |
| 27 | Straight line θ 27' | 0.05 | — | — | — | Chipping occurred | Small W2 |
| 28 | Straight line θ 29' | 0.05 | 1.4 | −0.4 | 2.62 | | Small W2 |
| 29 | Straight line θ 34' | 0.05 | 3.2 | −0.5 | 2.39 | | Large W2 |
| 30 | Straight line θ 28' | 0.05 | 5.3 | −0.5 | 2.35 | | Large W2 |

TABLE 1B

| | | Finishing cutting edge | | | | Superfinishing cutting, edge | | | |
|---|---|---|---|---|---|---|---|---|---|
| | | | | Width of wiper cutting edge W: mm | | R of wiper portion R2 | | | Width of burnishing portion L: mm |
| Sample No. | Nose R R1: mm | Chamfer angle β1: ° | Chamfer width W1: mm | | Shape of wiper cutting edge | | Chamfer angle β2: ° | Chamfer width W2: mm | |
| 31 | 0.8 | 35 | 0.13 | — | — | 0.8 | R | 0.02 | 0.5 |
| 32 | 0.8 | 45 | 0.13 | — | — | 0.8 | R | 0.02 | 0.5 |
| 33 | 0.8 | 25 | 0.13 | — | — | 0.8 | 15 | 0.03 | 0.5 |
| 34 | 0.8 | 25 | 0.13 | — | — | 0.8 | 25 | 0.03 | 0.5 |
| 35 | 0.8 | 25 | 0.13 | — | — | 0.8 | 35 | 0.03 | 0.5 |
| 36 | 0.8 | 25 | 0.13 | — | — | 0.8 | 45 | 0.03 | 0.5 |
| 37 | 0.8 | 25 | 0.13 | — | — | 0.8 | 15 | 0.05 | 0.5 |
| 38 | 0.8 | 25 | 0.13 | — | — | 0.8 | 25 | 0.05 | 0.5 |
| 39 | 0.8 | 25 | 0.13 | — | — | 0.8 | 35 | 0.05 | 0.5 |
| 40 | 0.8 | 25 | 0.13 | — | — | 0.8 | 45 | 0.05 | 0.5 |
| 41 | 0.8 | 25 | 0.13 | — | — | 0.8 | 25 | 0.03 | 0.5 |
| 42 | 0.8 | 25 | 0.13 | — | — | 0.8 | 25 | 0.05 | 0.5 |

| | Superfinishing cutting, edge | | | | | | |
|---|---|---|---|---|---|---|---|
| Sample No. | Shape of burnishing portion | Amount of projection B: mm | Thickness of affected layer: μm | Residual stress: GPa | Surface roughness: Rz | Remarks 1 | Remarks 2 |
| 31 | Straight line θ 31' | 0.05 | 1.3 | −0.4 | 2.42 | | Large β1 |
| 32 | Straight line θ 30' | 0.05 | 2.1 | −0.4 | 2.47 | | Large β1 |
| 33 | Straight line θ 29' | 0.05 | 2.7 | −0.4 | 2.48 | | R2 Negative land |
| 34 | Straight line θ 31' | 0.05 | 3.4 | −0.5 | 2.42 | | R2 Negative land |
| 35 | Straight line θ 28' | 0.05 | 3.8 | −0.4 | 2.63 | | R2 Negative land |
| 36 | Straight line θ 32' | 0.05 | 4.5 | −0.3 | 2.68 | | R2 Negative land |
| 37 | Straight line θ 29' | 0.05 | 5.1 | −0.3 | 2.53 | | R2 Negative land |
| 38 | Straight line θ 29' | 0.05 | 5.4 | −0.4 | 2.97 | | R2 Negative land |
| 39 | Straight line θ 32' | 0.05 | 6.2 | −0.5 | 2.58 | | R2 Negative land |
| 40 | Straight line θ 27' | 0.05 | 7.6 | −0.3 | 2.49 | | R2 Negative land |
| 41 | Straight line θ 33' | 0.05 | 4.2 | −0.5 | 2.36 | | R2 Negative land |
| 42 | Straight line θ 29' | 0.05 | 5.3 | −0.5 | 2.34 | | R2 Negative land |

Cutting tool samples No. 1 to No. 4 include inserts each having a conventional arcuate nose with a radius of curvature of 0.4 to 1.6 mm, and formed with a chamfer having a predetermined width (W1=0.13 mm) and an angle β1=25° along the ridgeline of the cutting edge. (With these samples No. 1 to No. 4, as well as samples No. 7 to No. 42, the border between the flank and the chamfer is rounded with a radius of curvature R of 0.01 mm.)

Cutting tool samples No. 5 and 6 include inserts having conventional arcuate noses having radii of curvature of 0.8 mm and 1.6 mm, respectively, and each formed with a round chamfer formed by honing along the cutting edge and having a width W1 of 0.02 mm.

Cutting tool samples No. 7 to No. 12 include inserts each formed with a chamfer having a constant width W1 of 0.13 mm and an angle $\beta 1$ of 25° along the ridgeline, and having an arcuate nose with a radius of curvature of 0.8 mm. Each insert is further formed with wiper cutting edges having a width L.

Cutting tool samples No. 13 to No. 42 include inserts each having a finishing cutting edge and superfinishing cutting edges projecting from the finishing cutting edge in the direction in which the tool is cut into a workpiece, Each superfinishing cutting edge includes a burnishing portion extending in the feed direction of the tool. The amount of projection B of the superfinishing cutting edges and the width L of the burnishing portions of each sample are shown in Tables 1A and 1B. In samples No. 41 and 42, the border between the chamfer having a width W2 and the flank is rounded with a radius of curvature of 0.01 mm.

The surface roughness of the finished surface (hereinafter simply referred to as the surface roughness), the residual stress of the finished surface (hereinafter simply the residual stress), and the thickness of the affected layer on the finished surface (hereinafter simply the thickness of the affected layer) were measured for tools which did not suffer from chipping when the cutting test was 60 minutes old.

The surface roughness is the ten-point average roughness (Rz) as measured in the axial direction of the workpiece with a cutoff of 0.8 μm and a reference length of 4 mm.

The residual stress was calculated as a Young's modulus of 214 GPa and a Poisson ratio of 0.279 by measuring X-ray diffraction lines on the $\alpha$-Fe (211) lattice plane by a sin 2ψ method (iso-inclination method) while exciting at 30 kV and 20 mA, using an X-ray diffraction device used by passing X-rays of Cu—K$\alpha$ through a V filter. In Tables 1A and 1B, the symbol "-" indicates that there remains compressive stress.

The thickness of the affected layer was measured by cutting the workpiece so that its machined surface appears on the cut surface by wire electric discharge machining (WEDM), grinding the cut surface to remove any affected layer produced by WEDM, subjecting the cut surface to etching using 5% nital, and observing the structure of the affected layer that appeared on the finished surface under a metallograph.

Cutting tool samples No. 5 and 6, which include inserts each having a conventional arcuate nose, suffered chipping due to insufficient cutting edge strength. Workpieces cut by cutting tool samples No. 1 to No. 4 developed affected layers having thicknesses in the range of 7.9 to 9.1 μm, and workpieces cut by cutting tool samples No. 7 to No. 12 developed affected layers having thicknesses in the range of 10.5 to 16.4 μm.

In contrast, the affected layers of workpieces cut by the cutting tool samples according to the present invention (samples No. 13 to 42) had reduced thicknesses of 0.6 to 7.6 μm, which suggests that the superfinishing surfaces served to remove affected layers.

Of the cutting tool samples according to the invention, samples No. 13 to 18 had superfinishing cutting edges that are identical in shape and different from each other only in the amount of projection B from the finishing cutting edge. Workpieces cut by these cutting tool samples were substantially identical in surface roughness to each other. However, the workpiece cut by sample No. 18 developed a affected layer having a thickness of 7.6 μm, which was larger than the thicknesses of affected layers formed on workpieces cut by sample No. 13 to 17. This is presumably because the depth of cut by the superfinishing cutting edges (amount of projection B of the superfinishing cutting edge) was large, i.e. 0.12 mm, so that a affected layer newly developed when the workpiece was being machined by the superfinishing cutting edges due to large heat generation during machining with the superfinishing cutting edges. Workpieces cut by samples No. 13 to 17, of which the amounts of projection B of the superfinishing cutting edges were 0.01 to 0.1 mm, developed affected layers having reduced thicknesses of not more than 5 μm. Thus, these samples are effective in improving the quality of the finished surface. A workpiece cut by sample No. 13 developed a affected layer that is thicker than that of a workpiece cut by sample No. 14, of which the amount of projection B of the superfinishing cutting edges was 0.02 mm. This is presumably because when the amount of projection B is 0.01 mm, the superfinishing cutting edges cannot sufficiently cut into the workpiece, so that the superfinishing cutting edges were unable to sufficiently remove a affected layer formed by the finishing cutting edge. Where the amount of projection B of the superfinishing cutting edge is smaller than 0.01 mm, the depth of cut of the superfinishing cutting edges into workpieces further decreases, so that it becomes further difficult to remove a affected layer.

A workpiece cut by sample No. 15, of which the amount of projection B of the superfinishing cutting edges was 0.05 mm, was the smallest in thickness of the affected layer. Workpieces cut by sample No. 14, of which the amount of projection B of the superfinishing cutting edges was 0.02 mm, and sample No. 16, of which the amount of projection B of the superfinishing cutting edges was 0.07 mm, were substantially equal in thickness of the affected layer to each other. These results show that the amount of projection B of the superfinishing cutting edges is preferably 0.01 to 0.1 mm, more preferably 0.02 to 0.07 mm.

Samples No. 19 and 20 have the radii of curvature of the wiper portions of their superfinishing cutting edges changed to 0.4 mm and 1.2 mm, respectively. Workpieces cut by these samples were substantially equal in thickness of the affected layer, residual stress and surface roughness to a workpiece cut by sample No. 15. This indicates that the radius of curvature of the wiper portion has no substantial influence on the quality of the finished surface.

Samples No. 21 to 26 have the shapes and cutting edge widths (lengths) of their respective burnishing portions varied. When samples No. 15, 21 and 22 are compared, it is apparent that the larger the cutting edge width of the burnishing portions, the better the surface roughness of the finished surface, and also, the greater the compressive residual stress and the thickness of the affected layer tend to be. This is because the greater the cutting edge width of the burnishing portions, the larger the number of times the surface is pressed and flattened.

Samples No. 23 to 26, which have superfinishing cutting edges including arcuate burnishing portions, are equivalent in performance to samples having straight burnishing portions. This indicates that the burnishing portions may be straight ones or arcuate ones.

Samples No. 27 to 30 have the chamfer widths of their superfinishing cutting edges varied. The chamfers of these samples are all round chamfers. Sample The chamfers of sample No. 27 have the smallest width, i.e. 0.003 mm. Thus, sample No. 27 was low in cutting edge strength, so that its cutting edges chipped at the initial stage of cutting. There is a tendency that the larger the chamfer width of the superfinishing cutting edges, the higher the compressive residual stress and the thicker the affected layer. This is because although the larger the chamfer width, the higher the residual compressive stress because the burnishing portions become less sharp and the pressing force increases, the cutting temperature increases at the same time, so that a affected layer develops when machined by the superfinishing cutting edges. A workpiece cut by sample No. 30, of which the chamfer width was 0.05 mm, developed a affected layer having a thickness exceeding 5 μm.

Samples No. 33 to 42 have the chamfer angles β2 of their superfinishing cutting edges varied within the range of 15 to 450. Their chamfer widths W2 are also varied within the range of 0.03 to 0.05 mm. Even though the chamfer angle β2 were varied, samples having chamfer widths W2 of 0.05 mm all developed affected layers thicker than 5 μm. These data show that the chamfer width of the superfinishing cutting edges is preferably set at 0.005 mm to 0.04 mm.

Samples of which the chamfer width is small, such as samples No. 5 and 6, tend to suffer premature chipping of the cutting edges. Therefore, the chamfer of the finishing cutting edge preferably has a width greater than the chamfers of the superfinishing cutting edge.

Samples No. 31 and 32 have the chamfer angles of their finishing cutting edges varied. It is expected that the larger the chamfer angle of the finishing cutting edge, the larger the thickness of the affected layer formed when the workpiece is cut by the finishing cutting edge. But by suitably setting the amount of projection B of the superfinishing cutting edges and the width of the burnishing portions, the affected layer can be removed by the superfinishing cutting edges. Thus, the chamfer angle of the finishing cutting edges has little influence on the thickness of the remaining affected layer, and the residual stress and surface roughness of the finished surface.

Example 2

Cutting tool samples No. 51 to 69 shown in Table 2 were prepared. Any of the cutting tools used in EXAMPLE 2 comprised a substrate made of cemented carbide, and cBN-based sintered members each having a thickness of 1.8 mm, a nose angle α of 800 and a bottom length of 4 mm, including a carbide backing made of cemented carbide and brazed to one of the corners of the substrate. The cBN-based sintered members are inserts each classified into CNMA120408, CNMA120412 or CNMA120416 under ISO and having a cutting edge comprising a finishing cutting edge forming an arcuate nose, and superfinishing cutting edges which characterize the present invention. The cBN-based sintered members were of the same composition as those used in EXAMPLE 1.

The finishing cutting edge of any sample had a chamfer angle of 25° and a chamfer width of 0.13 mm (the border between the chamfer and the flank being rounded with a radius of curvature of 0.01 mm). The chamfers of the superfinishing cutting edges were round chamfers having a radius of curvature of 0.02 mm and formed by honing. Each superfinishing cutting edge has a straight burnishing portion, and projects by an amount B of 0.05 mm from the finishing cutting edge.

After brazing each cBN-based sintered member with a carbide backing to the substrate, a rake face was formed at the cutting edge portion by grinding. For tool samples No. 51 to 67, the finishing cutting edge and the superfinishing cutting edges were formed by wire electric discharge machining (WEDM). For sample No. 68, the finishing cutting edge and the superfinishing cutting edges were formed by grinding with a forming grinder. For sample No. 69, the finishing cutting edge and the superfinishing cutting edges were formed by laser machining. Chamfers were formed on the finishing cutting edges and superfinishing cutting edges of any of the tool samples.

Figure 10:
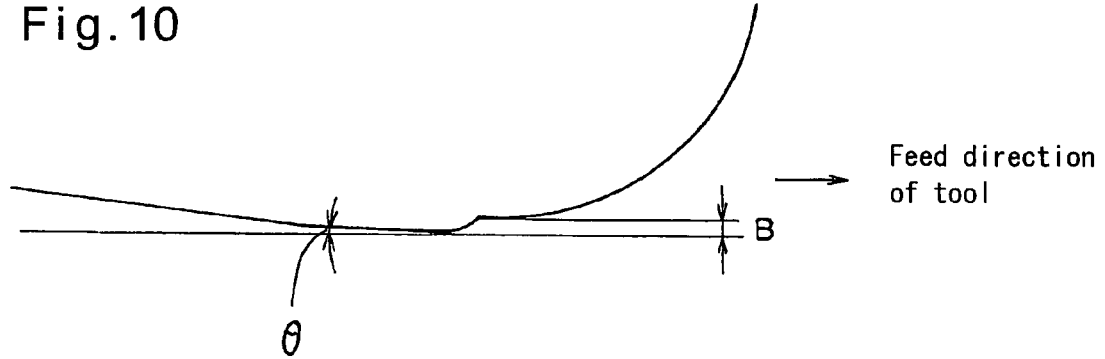
FIG. 10 shows an inclination of a burnishing portion of a superfinishing cutting edge with respect to a feed direction of the tool.

The burnishing portions of the superfinishing cutting edges were arranged so as to form an angle θ of $0° \ 20' \leq \theta \leq 0° \ 40'$ with respect to the feed direction of the tool (see FIG. 10). For tool sample No. 61, after all the machining steps completed, a hard film coating of (Ti0.5Al0.5)N was applied to the entire surface of the tool, including the surface of the substrate by PVD.

Each of tool samples No. 51 to 69 were mounted on a holder and used for cutting with the cutting edge inclination angle λ, side rake angle γn, end clearance angle αof, side clearance angle αos, end cutting edge angle κf and side cutting edge angle κs (see FIG. 12) set at −5°, −5°, 5°, 5°, 5° and 5°, respectively, under the following cutting conditions.

—Cutting Conditions—
Workpiece: JIS type: SCR415H, outer diameter cutting (equivalent to DIN type: 15Cr3); Hardness: HRc 58-60
Cutting speed: V=150 m/min.
Depth of cut: d=0.2-0.7 mm
Feed rate: f=0.05-0.7 mm/rev.
Type of cutting: Continuous cutting of the outer periphery of a round rod, with coolant for sample No. 62 and without coolant for other samples
Cutting time: 60 minutes In EXAMPLE 2, the thickness of a affected layer remaining on the finished surface, compressive residual stress of the finished surface and the amount of wear of the tool flank. The thickness of a affected layer and the compressive residual stress were measured in the same manner as in EXAMPLE 1.

The results of the evaluation test are shown in Table 2.

TABLE 2

| Sample No. | Finishing cutting edge Nose R R1: mm | Super-finishing cutting edge | | Cutting conditions | | | |
|---|---|---|---|---|---|---|---|
| | | Nose R R2: mm | Width L of burnishing portion L: mm | Cutting speed V: mm/min | Feed ratef: mm/rev | Depth of cut d: mm | Type of cutting |
| 51 | 0.8 | 0.8 | 0.5 | 150 | 0.05 | 0.2 | Dry |
| 52 | 0.8 | 0.8 | 0.5 | 150 | 0.08 | 0.2 | Dry |
| 53 | 0.8 | 0.8 | 0.5 | 150 | 0.1 | 0.2 | Dry |
| 54 | 0.8 | 0.8 | 0.5 | 150 | 0.15 | 0.2 | Dry |
| 55 | 0.8 | 0.8 | 0.5 | 150 | 0.2 | 0.2 | Dry |
| 56 | 0.8 | 0.8 | 0.5 | 150 | 0.3 | 0.2 | Dry |

TABLE 2-continued

| 57 | 0.8 | 0.8 | 0.5 | 150 | 0.5 | 0.2 | Dry |
| 58 | 1.2 | 0.8 | 0.5 | 150 | 0.1 | 0.2 | Dry |
| 59 | 1.6 | 0.8 | 0.5 | 150 | 0.1 | 0.2 | Dry |
| 60 | 0.8 | 0.8 | 0.5 | 150 | 0.15 | 0.2 | Wet |
| 61 | 0.8 | 0.8 | 0.5 | 150 | 0.15 | 0.2 | Dry |
| 62 | 0.8 | 0.8 | 0.5 | 150 | 0.15 | 0.3 | Dry |
| 63 | 0.8 | 0.8 | 0.5 | 150 | 0.15 | 0.5 | Dry |
| 64 | 0.8 | 0.8 | 0.5 | 150 | 0.15 | 0.7 | Dry |
| 65 | 0.8 | 0.8 | 0.2 | 150 | 0.05 | 0.2 | Dry |
| 66 | 0.8 | 0.8 | 0.2 | 150 | 0.08 | 0.2 | Dry |
| 67 | 0.8 | 0.8 | 0.2 | 150 | 0.15 | 0.2 | Dry |
| 68 | 0.8 | 0.8 | 0.5 | 150 | 0.15 | 0.2 | Dry |
| 69 | 0.8 | 0.8 | 0.5 | 150 | 0.15 | 0.2 | Dry |

| Sample No. | Thickness of affected layer: μm | Residual stress | Amount of wear of flank: mm | Remarks 1 | Remarks 2 Frequency of pressing and flattening |
|---|---|---|---|---|---|
| 51 | 3.8 | −0.7 | 0.082 | | 10.00 |
| 52 | 2.1 | −0.7 | 0.081 | | 6.25 |
| 53 | 0.7 | −0.6 | 0.085 | | 5.00 |
| 54 | 0.8 | −0.5 | 0.091 | | 3.33 |
| 55 | 1.2 | −0.3 | 0.094 | | 2.50 |
| 56 | 2.5 | −03 | 0.105 | | 1.67 |
| 57 | — | — | — | Chipping occurred | 1.00 |
| 58 | 0.9 | −0.6 | 0.087 | | 5.00 |
| 59 | 1.0 | −0.6 | 0.089 | | 5.00 |
| 60 | 0.4 | −0.6 | 0.092 | | 3.33 |
| 61 | 0.4 | −0.5 | 0.051 | PVD coating | 3.33 |
| 62 | 0.4 | −0.5 | 0.088 | | 3.33 |
| 63 | 0.6 | −0.5 | 0.092 | | 3.33 |
| 64 | 0.7 | −0.4 | 0.098 | | 3.33 |
| 65 | 1.9 | −0.6 | 0.079 | | 4.00 |
| 66 | 2.4 | −0.3 | 0.083 | | 2.50 |
| 67 | 2.6 | −0.3 | 0.085 | | 1.33 |
| 68 | 0.4 | −0.5 | 0.089 | Forming grinder | 3.33 |
| 69 | 0.4 | −0.5 | 0.092 | Laser machining | 3.33 |

Samples No. 51 to 57 are identical to each other and show the results when the feed conditions are changed with the width of the burnishing portions of the superfinishing cutting edges set at 0.5 mm. Samples No. 65 to 67 differ from samples No. 51 to 57 in that the burnishing portions of the superfinishing cutting edges have a width of 0.2 mm and show the results when the feed conditions are changed. These results show that there is a tendency that the higher the feed rate, the lower the compressive residual stress. This is presumably because, provided tools used are of the same shape, the lower the feed rate, the lower the heat generation and thus the greater the number of times the surface is pressed by the burnishing portions of the superfinishing cutting edges, so that compressive stress is more easily applied to the surface of the workpiece. But if the feed rate is too low, the number of times the surface is pressed and flattened increases excessively (e.g. to 10 times for sample No. 51). This increases the amount of a affected layer for the same reasons as when the burnishing portions have too large a width. When the feed rate was 0.5 mm/rev, the cutting resistance was too high, so that the load on the finishing cutting edge increased excessively, causing chipping of the cutting edge at the initial stage of cutting (sample No. 57). Thus, the feed rate f (mm/rev) is preferably about $0.08 \leqq f \leqq 0.3$.

The number of times the surface of the workpiece is pressed and flatted by the burnishing portions of the superfinishing surfaces is preferably two or more because by pressing and flattening the surface only once, no sufficient compressive residual stress can be applied to the surface of the workpiece. But if the number of times the surface is pressed and flattened is 10 or more, the amount of a affected layer formed by the superfinishing cutting edges increases to an unignorable level. Therefore, the width L of the burnishing portions and the feed rate f are preferably determined so as to satisfy the relation $2 \leqq L \text{ (mm)}/f \leqq 8$.

From the results of samples No. 54 and 60, it is apparent that the thickness of a affected layer is slightly smaller when the workpiece is cut in a wet state than in a dry state.

From the results of samples No. 54 and 61, it is apparent that the tool sample formed with a TiAlN film on the surface thereof (sample No. 61) was smaller in the amount of wear of the flank. Also, the cutting temperature was lower with sample No. 61 when the cutting time is the same, so that the production of a affected layer was suppressed.

When sample No. 54 is compared with samples No. 62 to 64, it is apparent that even though the depth of cut of the entire tool was changed, because the positional relation between the finishing cutting edge and the superfinishing cutting edges (i.e. the amount of projection B of the superfinishing cutting edges) was unchanged, the thickness of a affected layer and the residual stress scarcely changed. This indicates that the depth of cut of the entire tool during cutting has little influence on the quality of the finished surface.

When sample No. 54 is compared with Samples No. 68 and 69, it is apparent that even though the forming method of the finishing cutting edge and the superfinishing cutting edges is changed, because the positional relation between the finishing cutting edge and the superfinishing cutting edges (i.e. the amount of projection B of the superfinishing cutting edges) was unchanged, the thickness of a affected layer, the residual stress and the amount of wear of the flank scarcely changed. This indicates that the forming method of the finishing cutting edge and the superfinishing cutting edges has little influence on the quality of the finished surface.

What is claimed is:

1. A cutting tool for high-quality high-efficiency machining of which portions involved in cutting comprise hard members, said cutting tool including a finishing cutting edge which is first cut into a workpiece, and superfinishing cutting edges for finishing the workpiece following the finishing cutting edge, wherein said superfinishing cutting edges project from said finishing cutting edge in such a direction that the depth of cut increases, and each include a burnishing portion having a predetermined width in the feed direction of the tool, and a wiper portion extending from said finishing cutting edge to said burnishing portion, whereby said superfinishing cutting edges burnish a finished surface of the workpiece, while removing a affected layer formed on the finished surface by said finishing cutting edge, and wherein said finishing cutting edge and said superfinishing cutting edges have chamfers for strengthening the respective cutting edges, the chamfers of said superfinishing cutting edges having a width W2 that is smaller than the width W1 of the chamfer of said finishing cutting edge.

2. The cutting tool of claim 1, wherein the width W2 of said chamfers of said superfinishing cutting edges is set within a range of 0.005 mm≦W2≦0.04 mm.

3. A cutting tool for high-quality high-efficiency machining of which portions involved in cutting comprise hard members, said cutting tool including a finishing cutting edge which is first cut into a workpiece, and superfinishing cutting edges for finishing the workpiece following the finishing cutting edge, wherein said superfinishing cutting edges project from said finishing cutting edge in such a direction that the depth of cut increases, and each include a burnishing portion having a predetermined width in the feed direction of the tool, and a wiper portion extending from said finishing cutting edge to said burnishing portion, whereby said superfinishing cutting edges burnish a finished surface of the workpiece, while removing a affected layer formed on the finished surface by said finishing cutting edge, and wherein said finishing cutting edge is formed at a corner, and said superfinishing cutting edges are formed on right and left sides of said finishing cutting edge.

4. A cutting tool for high-quality high-efficiency machining of which portions involved in cutting comprise hard members, said cutting tool including a finishing cutting edge which is first cut into a workpiece, and superfinishing cutting edges for finishing the workpiece following the finishing cutting edge, wherein said superfinishing cutting edges project from said finishing cutting edge in such a direction that the depth of cut increases, and each include a burnishing portion having a predetermined width in the feed direction of the tool, and a wiper portion extending from said finishing cutting edge to said burnishing portion, whereby said superfinishing cutting edges burnish a finished surface of the workpiece, while removing a affected layer formed on the finished surface by said finishing cutting edge, and wherein said finishing cutting edge has steps in the direction in which the tool is cut into a workpiece, whereby said steps individually cut different portions of the workpiece.

5. A cutting tool for high-quality high-efficiency machining of which portions involved in cutting comprise hard members, said cutting tool including a finishing cutting edge which is first cut into a workpiece, and superfinishing cutting edges for finishing the workpiece following the finishing cutting edge, wherein said superfinishing cutting edges project from said finishing cutting edge in such a direction that the depth of cut increases, and each include a burnishing portion having a predetermined width in the feed direction of the tool, and a wiper portion extending from said finishing cutting edge to said burnishing portion, whereby said superfinishing cutting edges burnish a finished surface of the workpiece, while removing a affected layer formed on the finished surface by said finishing cutting edge, and wherein said burnishing portion of each of said superfinishing cutting edges has steps in the direction in which the tool is cut into a workpiece, whereby a finished surface of the workpiece is cut first by one of said steps of which the amount of projection B from said finishing cutting edge in the direction in which the tool is cut into the workpiece is the smallest, and then by another of said steps of which the amount of projection B is the second smallest.

6. A cutting tool for high-quality high-efficiency machining of which portions involved in cutting comprise hard members, said cutting tool including a finishing cutting edge which is first cut into a workpiece, and superfinishing cutting edges for finishing the workpiece following the finishing cutting edge, wherein said superfinishing cutting edges project from said finishing cutting edge in such a direction that the depth of cut increases, and each include a burnishing portion having a predetermined width in the feed direction of the tool, and a wiper portion extending from said finishing cutting edge to said burnishing portion, whereby said superfinishing cutting edges burnish a finished surface of the workpiece, while removing a affected layer formed on the finished surface by said finishing cutting edge, and wherein said hard members each comprise a cBN-based sintered body containing not less than 65% and not more than 85% by volume of cBN particles and having a thermal conductivity of not more than 70 W/m·K, and a hard film made of a carbide, nitride, oxide, carbonitride or carboxynitride of at least one element selected from the group consisting of the elements of the 4a, 5a and 6a groups in the periodic table and Al and covering the surface of said cBN-based sintered body.

7. A method of cutting a workpiece using the cutting tool of claim 6, wherein the workpiece is cut with the depth of cut d1 of the finishing cutting edge set to be greater than the depth of cut d2 of the superfinishing cutting edges, and the feed rate f (mm/rev) set so as to satisfy the relations $2 \leq L$ (width of the burnishing portions of the superfinishing cutting edges: mm)/$f \leq 8$ and $0.08 \leq f \leq 0.3$.

8. The cutting tool of claim 1, wherein said burnishing portions are straight portions or arcuate portions having a radius of curvature of not less than 2 mm, and wherein the width L of said burnishing portions is set within the range of 0.2 mm$\leq$L$\leq$1.0 mm, and the amount of projection B from said finishing cutting edge is set within a range of 0.01 mm$\leq$B$\leq$0.1 mm.

9. The cutting tool of claim 3, wherein said burnishing portions are straight portions or arcuate portions having a radius of curvature of not less than 2 mm, and wherein the width L of said burnishing portions is set within the range of 0.2 mm$\leq$L$\leq$1.0 mm, and the amount of projection B from said finishing cutting edge is set within a range of 0.01 mm$\leq$B$\leq$0.1 mm.

10. The cutting tool of claim 4, wherein said burnishing portions are straight portions or arcuate portions having a radius of curvature of not less than 2 mm, and wherein the width L of said burnishing portions is set within the range of 0.2 mm$\leq$L$\leq$1.0 mm, and the amount of projection B from said finishing cutting edge is set within a range of 0.01 mm$\leq$B$\leq$0.1 mm.

11. The cutting tool of claim 5, wherein said burnishing portions are straight portions or arcuate portions having a radius of curvature of not less than 2 mm, and wherein the width L of said burnishing portions is set within the range of 0.2 mm$\leq$L$\leq$1.0 mm, and the amount of projection B from said finishing cutting edge is set within a range of 0.01 mm$\leq$B$\leq$0.1 mm.

12. The cutting tool of claim 6, wherein said burnishing portions are straight portions or arcuate portions having a radius of curvature of not less than 2 mm, and wherein the width L of said burnishing portions is set within the range of 0.2 mm$\leq$L$\leq$1.0 mm, and the amount of projection B from said finishing cutting edge is set within a range of 0.01 mm$\leq$B$\leq$0.1 mm.

13. The cutting tool of claim 8, wherein the amount of projection B of said superfinishing cutting edges from said finishing cutting edge is set within a range of 0.02 mm$\leq$B$\leq$0.07 mm.

14. The cutting tool of claim 9, wherein the amount of projection B of said superfinishing cutting edges from said finishing cutting edge is set within a range of 0.02 mm$\leq$B$\leq$0.07 mm.

15. The cutting tool of claim 10, wherein the amount of projection B of said superfinishing cutting edges from said finishing cutting edge is set within a range of 0.02 mm$\leq$B$\leq$0.07 mm.

16. The cutting tool of claim 11, wherein the amount of projection B of said superfinishing cutting edges from said finishing cutting edge is set within a range of 0.02 mm$\leq$B$\leq$0.07 mm.

17. The cutting tool of claim 12, wherein the amount of projection B of said superfinishing cutting edges from said finishing cutting edge is set within a range of 0.02 mm$\leq$B$\leq$0.07 mm.

* * * * *